(No Model.)

R. MACDONALD.
INHALING APPARATUS.

No. 427,178. Patented May 6, 1890.

Attest:
A. N. Jesbera
E. M. Watson

Inventor:
Robert Macdonald
By David A. Burr
Atty.

UNITED STATES PATENT OFFICE.

ROBERT MACDONALD, OF NEW YORK, N. Y.

INHALING APPARATUS.

SPECIFICATION forming part of Letters Patent No. 427,178, dated May 6, 1890.

Application filed May 10, 1889. Serial No. 310,266. (No model.)

*To all whom it may concern:*

Be it known that I, ROBERT MACDONALD, of the city, county, and State of New York, have invented certain new and useful Improvements in Apparatus for the Inhalation of Hot Air; and I do hereby declare that the following is a full and exact description thereof, reference being had to the accompanying drawings, and to the letters of reference marked thereon, making a part of this specification.

This invention relates to an improved apparatus for promoting hot-air inhalation as a remedial agent for the cure of diseases of the lungs.

It has for its object to obtain within the smallest compass and with the greatest economy of heat the maximum efficiency in producing a constant supply of pure air heated to a temperature of 400° and upward, and to provide for the combination therewith of any required medicinal agents.

It consists in the novel combination and arrangement of the several parts of the device, as hereinafter described and claimed.

Figure 1:
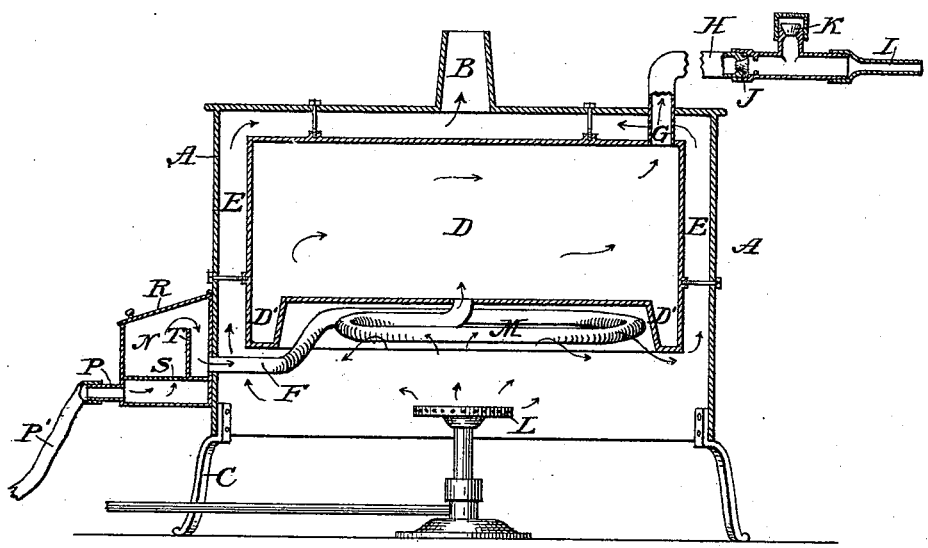
Figure 2:
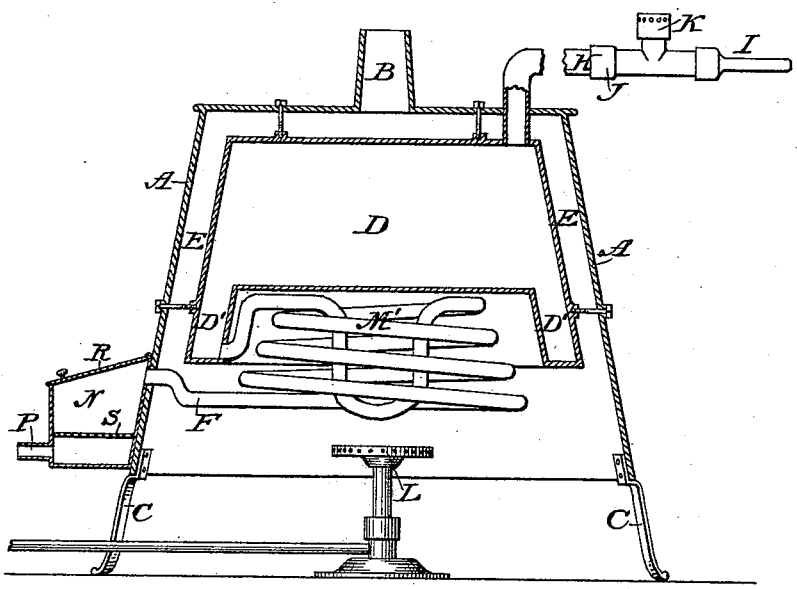

In the accompanying drawings, Figure 1 is a sectional view illustrating the construction of my improved apparatus, and Fig. 2 a similar view illustrating modifications therein.

In said drawings, A represents an outer drum or casing of suitable form closed at the top and open at the bottom. This outer drum or casing is preferably supported upon legs C C, by which it is upheld far enough above the table upon which it may be placed to allow a free access of air under the same, and is fitted at the top with a central discharge-flue B. Within this outer casing is suspended an inner closed vessel D, of thin sheet metal, made so far smaller in its dimensions than the casing A as to leave an open space and passage E between the two, said space or passage being made, preferably, of a uniform width to completely surround the vessel D, constituting the heating-chamber of the apparatus. The bottom of this inner vessel or heating-chamber D is preferably inwardly recessed, and a narrow marginal downward extension D' of the chamber is thus produced to encircle a central space under the bottom thereof.

An air-supply pipe F is connected to the bottom or lower end of the chamber D. An eduction-pipe G is fitted to its upper end, to extend thence outwardly through the casing A, and to this eduction-pipe G is fitted an inhaling-tube H, provided, as is customary, with a mouth-piece I, a suction-valve J, which opens toward the mouth-piece when air is being inhaled through it, and a delivery-valve K, which closes when the valve J opens and opens when an expiration is made of the inhaled air.

A Bunsen burner L or other equivalent heating device is placed under the chamber D, so that the hot flame shall be carried against the bottom of the chamber and, with the heated gases and products of combustion, be deflected therefrom and carried up through the encircling passage E over the entire outer surface of the chamber D, and finally discharged through the flue B.

To render the heating device more efficient, the pipe F, by which the supply of fresh air is admitted to the chamber D, is preferably extended in a coil M, Fig. 1, under the bottom of the chamber before entering it, so as to be exposed directly to the heat of the burner, and this coil may be so extended, as shown at M' in Fig. 2, and inclosed laterally within the external recess in the bottom of the chamber, as that the heating of the air-supply may be largely effected in the coil before it is delivered into said chamber.

N represents an auxiliary chamber formed upon the side of the casing A for the purpose of impregnating the supply of air delivered to the heating-chamber D with any suitable medicament needed in the treatment of the lungs by inhalation. This medicating-chamber N is made to communicate directly with the chamber D by means of the connecting-pipe F, and is supplied with air by means of a pipe P, to which may be fitted a tube P', to extend through the apartment in which the apparatus is used to the outer air, and thereby insure freshness and purity in the supply.

The chamber N is provided with a door or lid R, through which the medicament may be introduced, and with a perforated partition or grating S, upon which to supply it, so that the current of air may pass freely over or through the medicament, this end being facilitated, where the eduction-port of the medicating-chamber is formed near the lower end thereof, by means of a partition-plate T, (see Fig. 1,) extending from the bottom nearly to the top of the chamber in front of said port.

In the use of the apparatus a supply of pure, fresh air, preferably drawn from out-of-doors, is introduced through the induction-pipe P into the medicating-chamber N, and thence, through the connecting-pipe F and coil M, to the heating-chamber D. Thence it is delivered through the discharge-pipe G to the inhaling-tube H, to be drawn into the lungs of the patient at the mouth-piece I, the suction-valve J being opened and the discharge-valve K closed by the act of inhalation. The exhalation of the foul air from the lungs is effected through the valve K, the suction-valve J closing automatically so soon as the return pressure is exerted thereon. During its passage through the coil M and its momentary detention in the chamber D the fresh air is heated by means of the burner L, as described, to the high temperature required for the destruction of the bacilli in the lungs and the healing of its tissues.

I claim as my invention—

1. The hot-air-inhaling apparatus comprising an outer casing open at the bottom and having at the top a discharge-vent, a burner placed in the lower portion of said casing, a closed air-chamber mounted within the casing above the burner, so that the products of combustion shall encompass its walls in flowing to the discharge-vent, an air-supply pipe extending outwardly from the air-chamber, and an inhaling-tube communicating with said chamber and having suitable suction and discharge valves, substantially in the manner and for the purpose herein set forth.

2. The combination, in a hot-air inhaler, with the inhaling-tube and its suction and discharge valves, of the closed metallic heating-chamber having a re-entrant recess or pocket in the bottom thereof to form an annular space within it, a burner fitted directly under said recess, an encircling flue formed by an outer casing covering and inclosing said chamber and burner, and an air-supply pipe connected with the chamber, substantially in the manner and for the purpose herein set forth.

In testimony whereof I have signed my name to this specification in the presence of two subscribing witnesses.

ROBERT MACDONALD.

Witnesses:
A. N. JESBERA,
E. M. WATSON.